UNITED STATES PATENT OFFICE 2,552,321

WAXY CONDENSATION PRODUCT OF ALKYLOLAMINE, FATTY ACID, AND POLYCARBOXYLIC ACID

David W. Jayne, Jr., Old Greenwich, and Harold M. Day, Cos Cob, Conn., assignors to American Cyanamid Company, New York, N. Y., a corporation of Maine No Drawing. Application July 10, 1946, Serial No. 682,582

4 Claims. (Cl. 260—404.5)

This invention relates to synthetic wax products and more particularly, to synthetic waxes which are reaction products of an alkylolamine, a higher fatty acid and a polycarboxylic acid.

It is an object of the present invention to prepare new chemical compounds derived from alkylolamines, fatty acids and polycarboxylic acids.

It is a further object of the present invention to prepare new chemical compounds which have properties similar to those of the naturally occurring waxes and which may therefore be substituted therefor.

Another object of the present invention is to prepare wax products which are hard, lustrous and stable and which possess sharp melting points.

Still another object of the present invention is the preparation of products which may be used in wax and polish compositions as well as for the coating of citrus fruit, paper and textiles and as mold lubricants.

Another object of the present invention is the preparation of improved synthetic waxes.

These and other objects are attained by bringing about reaction between an alkylolamine, a higher fatty acid and a polycarboxylic acid in such proportions that the reaction product thereof is free of unreacted hydroxy, amino or carboxyl groups.

The invention will be described in greater detail in conjunction with the following specific examples in which the proportions are given in parts by weight unless otherwise indicated. The examples are merely illustrative and it is not intended that they should restrict the scope of the invention.

Example 1

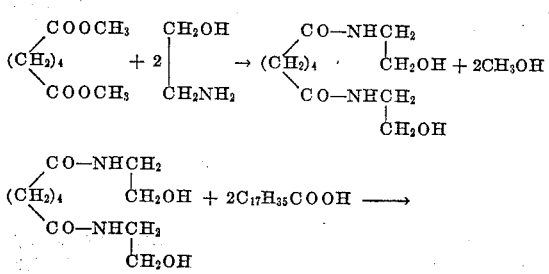

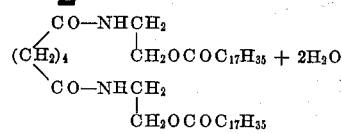

800 parts of dimethyl adipate (4.6 mols)
560 parts of monoethanolamine (9.2 mols)
2600 parts of stearic acid (9.2 mols)
10 parts of beta-naphthalene sulfonic acid A mixture of the dimethyl adipate and the monoethanolamine is heated in a distilling vessel to 200° C. during which operation approximately 300 parts of methanol are collected as distillate. The product, which is the ethanolamide of adipic acid, is transferred to an open vessel and the stearic acid and napthalene sulfonic acid are added thereto. This mixture is heated to 200° C. and maintained at 200°–205° C. until evolution of steam has ceased.

When cooled the product is a hard, light cream colored wax which melts at 89° C. on a standard melting point bar.

Example 2

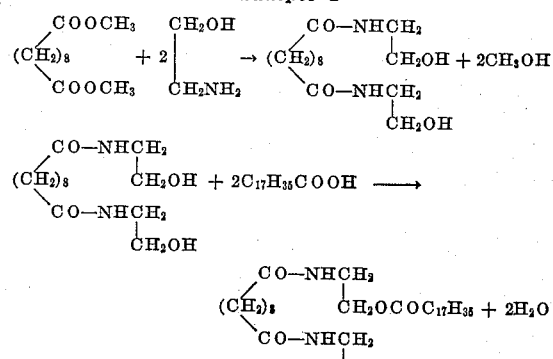

1000 parts of dimethyl sebacate (4.35 mols)
530 parts of monoethanolamine (8.7 mols)
2470 parts of stearic acid (8.7 mols)
10 parts of beta-naphthalene sulfonic acid.

The procedure of Example 1 is followed, and the product obtained is a hard, light cream colored wax which melts at 94° C. on a standard melting point bar.

Example 3

$$C_{17}H_{35}COOH + \underset{\underset{CH_2OH}{|}}{CH_2NH_2} \longrightarrow \underset{\underset{CH_2OH}{|}}{C_{17}H_{35}CONHCH_2}$$

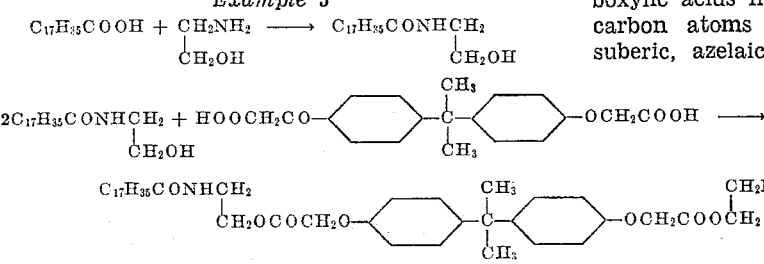

31 parts of monoethanolamine (0.5 mol)
142 parts of stearic acid (0.5 mol)
86 parts of bis(p-phenoxyacetic acid) dimethylmethane (0.25 mol)
Trace of beta-naphthalene sulfonic acid The stearic acid and monoethanolamine are heated to 200° C. until foaming ceases. The resulting melt is cooled to 100° C. and the bis-(p-phenoxyacetic acid) dimethylmethane and beta-naphthalene sulfonic acid are then added. The temperature is held at 200° C. for two hours after which the reaction mixture is poured.

A hard waxy material melting at 67° C. on a standard melting point bar is obtained.

The present invention is in no sense limited to the specific wax-like compounds of the examples. Other alkylolamines such as diethanolamine, butanolamine, dibutanolamine, pentanolamine, dipentanolamine, hexanolamine, dihexanolamine, isobutanolamine, di-isobutanolamine, dodecanolamine, didodecanolamine, etc., may be substituted for the monoethanolamine of the examples as may branched chain isomers, homologues, and substitution products thereof including monoalkyl monoalkylolamines such as monoethyl monoethanolamine, monoaryl monoalkylolamines such as N-phenyl monoethanolamine, and monoaralkyl monoalkylolamines such as N-benzyl monoethanolamine.

The fatty acid used in the preparation of the synthetic waxes of the present invention should contain at least six carbon atoms. There is theoretically no upper limit on the number of carbon atoms in the acid because the more carbon atoms it contains, the more wax-like are the properties of the acid itself. However, for practical purposes from the standpoint of commercial availability and economic feasibility, fatty acids having from six to twenty carbon atoms constitute the preferred embodiment of our invention. Fatty acids which may be used include n-caproic, n-heptoic, caprylic, n-nonylic, capric, undecylic, etc., and branched chain isomers, homologues and substitution products thereof. Moreover, stearic, palmitic, oleic, linoleic, lauric, myristic, ricinoleic, montanic and melissic acids, wax fatty acids such as those obtained from weeswax and carnauba wax, naphthenic acids, talloel acids, fatty acids obtained from oils such as corn oil, cottonseed oil, soyabean oil, etc., may also be used.

Suitable polybasic acids for use either as such or in the form of esters thereof, in the preparation of the products of the present invention, include saturated aliphatic dicarboxylic acids, aromatic dicarboxylic acids, and alicyclic dicarboxylic acids. Aromatic dicarboxylic acids such as phthalic acid or phthalic acid anhydride, isophthalic acid, terephthalic acid, mellitic acid, bis-(p-phenoxyacetic acid) dimethyl methane, methylene bis-(p-phenoxyacetic acid), etc., may be used in the preparation of the waxes of the present invention. Saturated aliphatic dicarboxylic acids having from about 6 to about 14 carbon atoms and including adipic, pimelic, suberic, azelaic, sebacic, etc., may be used as may alicyclic dicarboxylic acids such as the dicarboxylic acids of cyclopropane, cyclobutane, cyclopentane, cyclohexane, etc. We prefer to use esters of these acids in the process of the present invention, and more particularly alkyl esters such as methyl, ethyl, isopropyl, amyl, hexyl, isobutyl, etc. Polycarboxylic acid and esters thereof such as citric acid, benzene tricarboxylic acids, benzene tetracarboxylic acids, etc., may also be used.

Relative proportions of amine, acid and polycarboxylic acid used to produce our new waxes will vary depending upon the constitutions of these various ingredients of the reaction mixture because there may be no unreacted active groups such as hydroxy, amino or carboxyl in the synthetic wax-like reaction products. In general, when two mols of primary alkylol amine $HOYNH_2$ where Y is an alkylene radical, are reacted with one mol of dicarboxylic acid $X(COOH)_2$ where X is an aromatic, alicyclic or saturated aliphatic radical, or a diester thereof, to form an amide of the type $X(CONHYOH)_2$, two mols of higher fatty acid RCOOH where R is a higher alkyl radical must then be supplied to acylate the free hydroxy groups of the amide and produce the final wax-like product $X(CONHYOCOR)_2$. If, in the formation of the dicarboxylic acid amide, one mol of primary alkylolamine and one mol of secondary alkylolamine are reacted with one mol of the dicarboxylic acid, three mols of fatty acid will be required to effect complete neutralization of the hydroxy groups. Furthermore, if all secondary alkylolamine is used in the reaction mixture, four mols of fatty acid must be supplied.

Another type reaction may take place, and here again the products vary depending upon the proportions of reactants and the types of reaitants used. If two mols of an alkylolamine are reacted with two mols of a higher fatty acid and the resulting amide is reacted with one mol of dicarboxylic acid, a compound of the type $X(COOYNHCOR)_2$ is formed. If a secondary alkylolamine is reacted with the higher fatty acid in a 1:1 molar proportion, the product may be combined with one mol of dicarboxylic acid to produce a cyclic compound

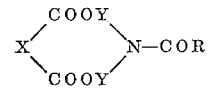

or two mols of the fatty acid amide may react with two mols of the dibasic acid to produce the cyclic compound

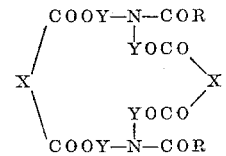

In general, then, we may say that for every mol of dicarboxylic acid utilized from about one to two mols of alkylolamine and from about one to four mols of fatty acid take part in the reaction.

The various products obtained as described above may be represented by one or the other of the following general formulae:

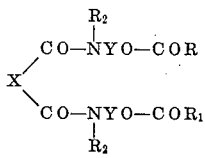

and

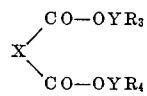

in which R and $R_1$ are alkyl radicals having at least six carbon atoms, X is selected from the group consisting of saturated aliphatic radicals having from 4 to 12 carbon atoms, alicyclic radicals and aromatic radicals, Y is an alkylene radical, $R_2$ is selected from the group consisting of hydrogen, —YO—COR and —YO—$COR_1$, $R_3$ and $R_4$ are each a radical —NH—COR or taken together, form a radical selected from the group consisting of >N—COR and

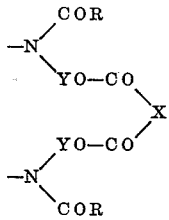

The preferred embodiments of our invention fall within the scope of the above general formulae but the invention is not to be limited to compounds of those particular structures.

It is an advantage of the present invention that economical and satisfactory substitutes for natural waxes have been produced. Natural vegetable and animal waxes which consist chiefly of long chain esters such as myristyl palmitate and cetyl palmitate are sometimes scarce, always quite expensive and, of course, possess definite unchanging specific properties. The duplication of the chemical structure of the natural waxes is not economically feasible because the reactants are not readily available from cheap raw materials. By means of the present invention we have succeeded in synthesizing from commercially available relatively cheap materials products which possess wax-like properties. These prod-

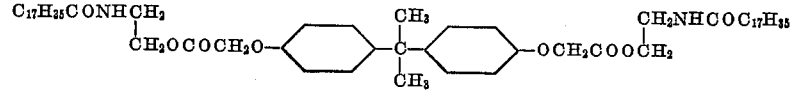

ucts can be substituted for natural waxes in many applications, and often are found more desirable due to a certain amount of flexibility of predetermined specific characteristics and properties. It is a further advantage of the present invention that the wax-like compounds prepared may be used as solutions in such solvents as carbon tetrachloride, alcohols, oils and the like or they may be emulsified and employed in that form.

Other synthetic and/or natural waxes may, of course, be used in admixture with the synthetic waxes of the present invention, just as mixtures of more than one of our synthetic waxes may be used.

Another advantage of the present invention resides in the fact that the wax-like products may serve as intermediates in the preparation of other useful compounds. For example, they may be converted into wetting and emulsifying agents by the introduction of hydrophilic groups into the molecules. Without such introduction, however, the products are extremely hydrophobic due to the fact that there are no free, unreacted amino, hydroxy or carboxyl groups present.

We claim:

1. A hard, lustrous and stable synthetic wax having a sharp melting point which consists of a compound selected from the group consisting of compounds represented by the following general formulae:

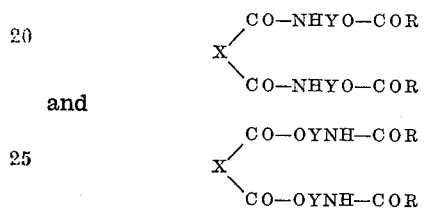

in which R is an alkyl hydrocarbon radical of from 6 to 20 carbon atoms, X is selected from the group consisting of saturated aliphatic radicals of from 4 to 12 carbon atoms, alicyclic radicals and aromatic radicals, and Y is an alkylene hydrocarbon radical, said compound having no unreacted hydroxyl, carboxyl and amino groups.

2. A hard, lustrous and stable synthetic wax having a sharp melting point which consists of the compound represented by the following formula:

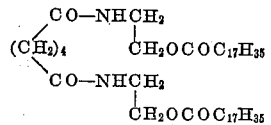

3. A hard, lustrous and stable synthetic wax having a sharp melting point which consists of the compound represented by the following formula:

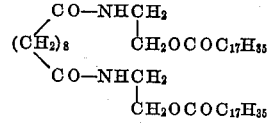

4. A hard, lustrous and stable synthetic wax having a sharp melting point which consists of the compound represented by the following formula:

DAVID W. JAYNE, JR.
HAROLD M. DAY.

REFERENCES CITED

The following references are of record in the file of this patent:

UNITED STATES PATENTS

| Number | Name | Date |
|---|---|---|
| 2,225,189 | Wayne | Dec. 17, 1940 |
| 2,373,230 | De Groote et al. | Apr. 10, 1945 |
| 2,379,413 | Bradley | July 3, 1945 |